United States Patent [19]

La Rose

[11] Patent Number: 4,766,660
[45] Date of Patent: Aug. 30, 1988

[54] PROCESS FOR ELONGATING VEHICLE DOORS

[76] Inventor: Keith M. La Rose, 21957 Audrey, Warren, Mich. 48089

[21] Appl. No.: 34,675

[22] Filed: Apr. 6, 1987

[51] Int. Cl.⁴ .............................................. B22D 19/10
[52] U.S. Cl. .................... 29/401.1; 29/426.4; 296/146
[58] Field of Search ............... 29/401.1, 426.4, 428, 29/402.03, 402.04, 402.09, 402.12, 402.13, 402.16, 402.19, 521; 49/502, 506; 72/379; 296/146, 147

[56] References Cited

U.S. PATENT DOCUMENTS

| | | |
|---|---|---|
| 3,132,236 | 5/1964 | Deininger . |
| 3,159,419 | 12/1964 | Kerby . |
| 3,419,304 | 12/1968 | Sangimino . |
| 3,865,638 | 2/1975 | Ballantyne et al. . |
| 4,014,585 | 3/1977 | Earnhart . |
| 4,049,309 | 9/1977 | Seal . |
| 4,282,641 | 8/1981 | Phillips . |
| 4,399,600 | 8/1983 | Draper et al. .................... 29/401.1 |
| 4,567,636 | 2/1986 | Draper et al. .................... 29/401.1 |

Primary Examiner—Timothy V. Eley
Attorney, Agent, or Firm—Gifford, Groh, VanOphem, Sheridan, Sprinkle and Dolgorukov

[57] ABSTRACT

A process for forming elongated vehicle doors includes the steps of removing the sheet metal skin from the existing door, severing the door substructure into two portions and inserting appropriately sized extension sections into the door substructure. A new elongated skin is contoured to match the side of the vehicle body and is cut to the shape of the elongated door. The new skin is placed in an adjustable mold fixture and end flange portions are hammered over the mold. The adjustable mold includes two lower portions which are contoured and configured to simulate the underlying door substructure, and two upper mold portions similarly contoured and configured, which are clamped to the lower mold portions with the new skin between the upper and lower mold portions. The molds are kirksite molds made directly from components of the door, and adjusting the spacing between the mold portions permits the manufacture of skins of different lengths to go on doors of different lengths.

20 Claims, 3 Drawing Sheets

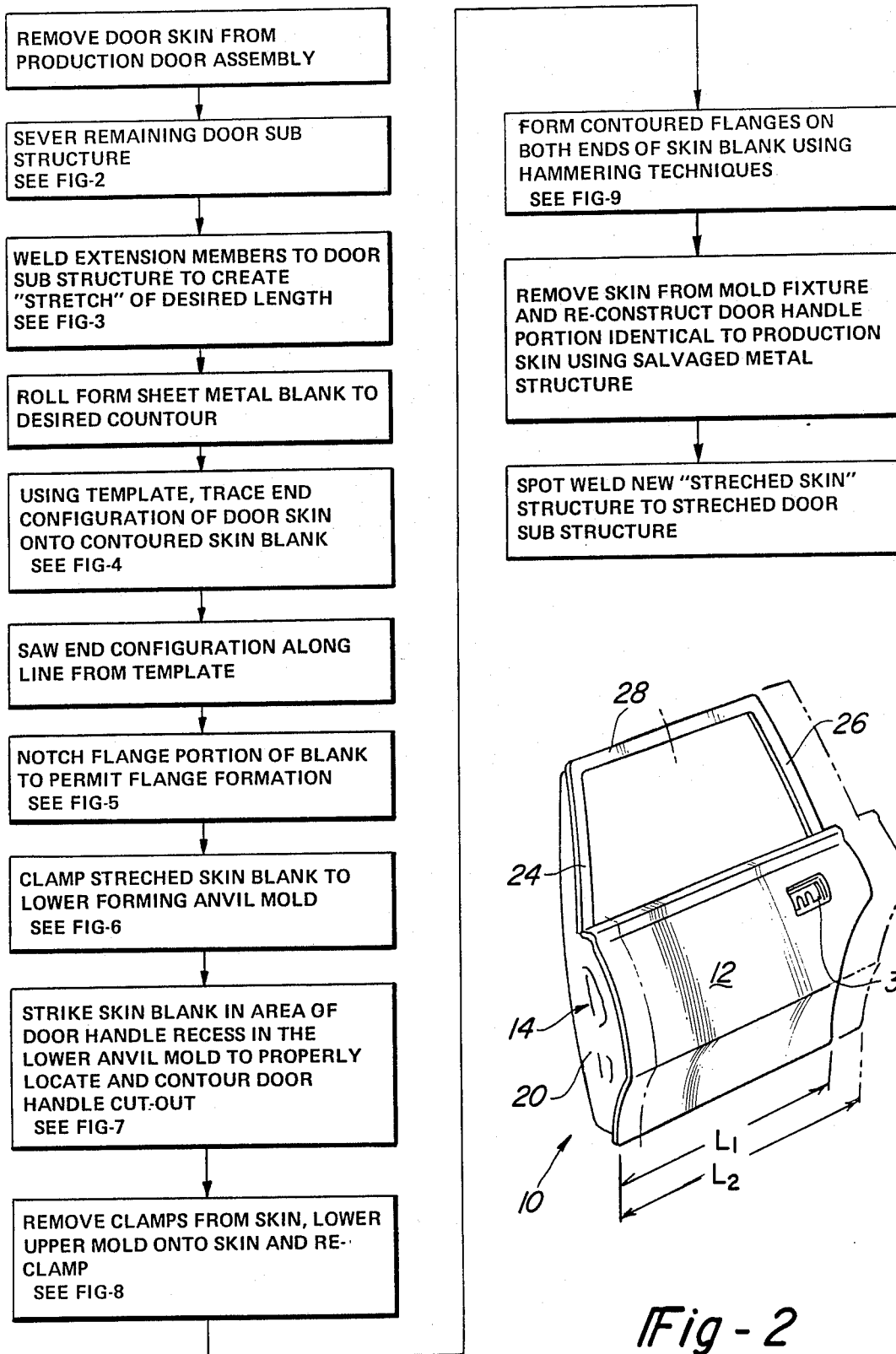

PROCESS FOR ELONGATING VEHICLE DOORS

BACKGROUND OF THE INVENTION

I. Field of the Invention

This invention relates to an improved process for elongating vehicle doors and, in particular, to a process which involves forming and attaching a new sheet metal skin to an extended door substructure.

II. Description of the Prior Art

It has previously been known to form elongated or "stretch" limosines by cutting the body and chassis into two portions, inserting extensions between the two portions and reassembling the vehicle. U.S. Pat. No. 4,014,585 discloses such a process. The elongated doors for such stretch limosines have previously been formed in a similar fashion. In particular, the door is first severed vertically into front and rear portions and a central extension portion is inserted between the two end portions. The central portion is welded to the front and rear portions along the outside finished face of the door as well as along the inner panel of the door substructure and various other structural locations such as structural support beams. The outer face or skin of the elongated door was then ground to smooth the welds, and refinished.

This previously known method for elongating doors is disadvantageous primarily because it is difficult to grind and finish the outer skin of the door with sufficient precision to eliminate all flaws. Invariably the resulting doors contained raised or depressed portions in the central inserted region, or noticeable ridges in the areas of the welds. These and other disadvantages are overcome by the present invention.

SUMMARY OF THE PRESENT INVENTION

The present invention encompasses a method for elongating vehicle doors which applies a fresh elongated outer skin to an elongated door substructure. The new skin is attached in much the same way as the original skin was attached to the standard door and, thus, weld spots and rough finish flaws do not appear on its outer surface.

First, the existing sheet metal skin is removed from the standard production door and the remaining door substructure is severed vertically into a front and a rear portion. Appropriately sized extensions are then welded into the door substructure to give it the desired length and sufficient structural rigidity. A new sheet metal skin is rollformed or pressed into a contour which matches the side contour of the vehicle. The contoured sheet metal is then cut to the configuration of the elongated door, i.e. to accommodate the wheel wells, door jambs and other structural features.

The contoured and configured new skin is then placed on a pair of kirksite anvil molds which are similarly contoured and configured to simulate the shape of the underlying door substructure. A flanged portion extends past the edge of the anvil molds. Preferably an upper mold, also contoured and configured to match the new skin, is placed on top of the new skin directly above the lower anvil molds. The extending flange can then be hammered down over the edge of the anvil molds. By employing two anvil or lower molds and two upper molds, the length of the resulting elongated skin can be varied to correspond to the underlying elongated door substrucure simply by adjusting the space between the corresponding ends of the molds.

Once the flange is formed in the new skin, it can be attached to the elongated door substructure by wrapping the flanges around the edge of the substructure and welding them thereto.

BRIEF DESCRIPTION OF THE DRAWINGS

A more complete understanding of the invention can be obtained from the following detailed description when read in conjunction with the accompanying drawings, in which like reference characters refer to like parts throughout the several views, and in which:

FIG. 1 is a block diagram indicating the various steps of the process;

FIG. 2 is a perspective view of a standard door, showing the vertical line along which it is severed;

DETAILED DESCRIPTION OF THE PREFERRED EMBODIEMNT

Figure 3:
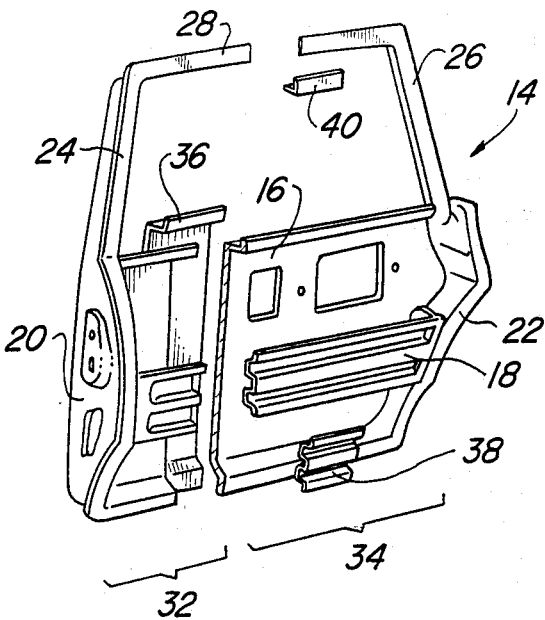
FIG. 3 is a perspective view of an elongated door substructure with its skin removed, showing the inserted extension sections.

Referring first to FIG. 1, the process of the present invention is thereshown in schematic or block diagram. The process is useful for elongating a standard production vehicle door 10 (FIG. 2) which includes an outer panel comprising a sheet metal skin 12 which is attached to an underlying door substructure 14. The door 10 can be elongated by any convenient amount, for example, from $L_1$ to $L_2$. As best shown in FIG. 3, the door substructure 14 includes an inner door panel 16, a longitudinal bracing beam 18 and end portions 20 and 22. In addition, the door substructure 14 includes window uprights 24 and 26 and upper window frame 28. Referring again to FIG. 2, the standard production skin 12 includes a rectangular opening 30 in which the door handle mechanism is located.

The first step of the improved process comprises removing the existing sheet metal skin 12 from the standard door substructure 14. This can be accomplished in a well known manner by grinding away the spot welds which attach the skin 12 to the door substructure 14.

Referring to FIGS. 2 and 3, the second step comprises severing the remaining standard door substructure 14 vertically into front and rear portions 32 and 34 respectively. The line along which the door 10 is severed may be a direct vertical line, but preferably the cut made through the inner door section 16 and the bracing beam 18 is positioned about 6 inches from the front edge to avoid lock, window and latch mechanisms in the door. The cut through the upper window frame 28 is preferably made exactly in the center between uprights 24 and 26 to minimize the effect of any bowing of the upper frame member 28.

The third step comprises welding extension members of predetermined length into the door substructure 14 to form the elongated door substructure 14'. As shown in FIG. 3, an inner door panel extension 36 is welded to the inner door panel 16 between front and rear portions 32 and 34. Similarly, a bracing beam extension section 38 is inserted in the bracing beam 18, and upper window frame extension section 40 is inserted in the upper window frame 28 to create the elongated door substructure 14'. The extension sections 36, 38 and 40 are all the same predetermined length and are selected depending on the extent of elongation desired in the particular door 10'. For example, standard production doors 10 are typically elongated by 4 inches, 6 inches and 8 inches, although other lengths are certainly possible and are contemplated within the scope of this invention.

The severing step and the insertion of extensions step are similar to those steps previously known in the art and are not described in detail. Rather than welding an extension section into the outer door skin 12, however, an entirely new skin 12' is formed according to the process of the present invention. The new skin 12' is formed from a sheet metal blank by rollforming it to the desired contour. As used herein, the term "contour" refers to the cross sectional shape of the new skin which conforms to the side of the vehicle body. In other words, the contour of the new door 10' must match that of the side of the vehicle body on which the door will be used.

Figure 4:
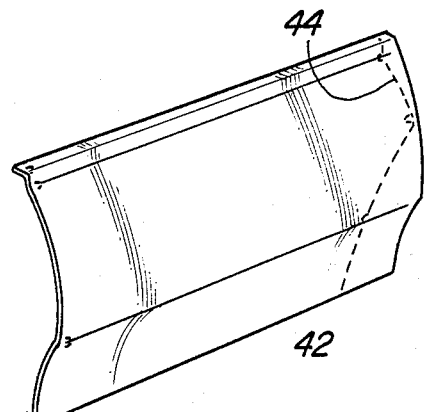
FIG. 4 is a view of the rollformed new skin and the template used to configure it.

Next, as shown in FIG. 4, the contoured blank 42 is cut along the ends into a shape which matches the configuration of the underlying door substructure 14'. As used herein, and as contrasted with "contour", the term "configuration" refers to the shape of the door in plan view and it accounts for the location of wheel wells, door jambs and other body structural features. The contoured and configured sheet metal blank will be referred to herein as the new skin 12'.

As shown in FIG. 4, configuring the contoured blank 42 preferably is accomplished by using a template 44 which is placed on the contoured blank 42 so that it can be marked for cutting. The template 44 can be made from any lightweight material such as paper or cardboard and is made a selected, predetermined length. Specifically, the template 44 is dimensioned to include the additional predetermined extension length plus an additional ½ inch at each end which accounts for the flanges 46 which will be described in detail hereinafter.

Figure 5:
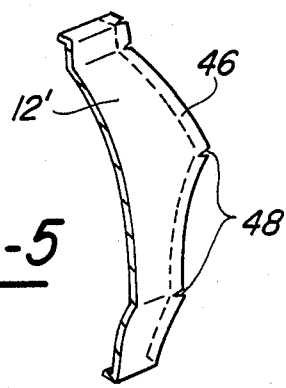
FIG. 5 is a fragmented view of the new skin showing notches in the flange portion.

Referring now to FIG. 5, the new skin 12' can be seen with its appropriate contour and configuration. At the ends (one shown) of the new skin 12' is a border of flange 46. The flange 46 is divided by intermittent notches 48 which are cut into the ends of the new skin 12' approximately the depth of the flange 46, ½ inch, for example. The notches 48 are conveniently located at points where either the contour or the configuration changes abruptly. The notches 48 facilitate bending the flanges 46 as will be subsequently described.

Figure 6:
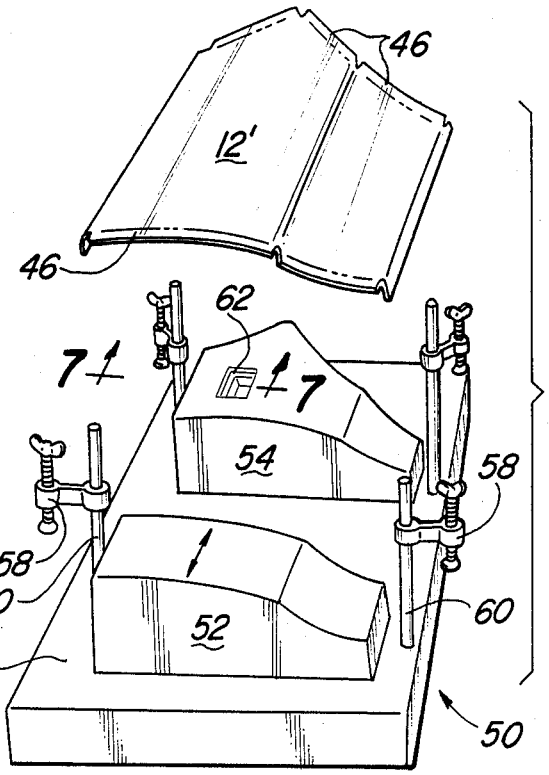
FIG. 6 is a perspective view of the mold fixture, including the lower anvil molds appropriately spaced and mounted to a supporting table.

FIG. 6 shows a mold fixture 50 comprising a pair of lower anvil molds 52 and 54 resting on a support table or surface 56. Clamps 58 adjustably disposed on pipes 60 are mounted to the support surface 56. The clamps 58 can be raised or lowered along the pipes 60 and can also be turned inwardly or outwardly with respect to one another by means well known in the art.

The lower anvil molds 52 and 54 are contoured and configured to simulate the ends of the elongated door substructure 14'. One mold 52 is configured to match the end 20 of the front portion 32 of the door substructure 14', while the other mold 54 is configured to match the end 22 of the rear portion 34 of the door substructure 14'. The molds 52 and 54 are spaced apart a specific distance depending on the amount of extension required for the particular door 10' and can be used for doors of varying length by simply adjusting the spacing between the molds 52, 54. The outer edges of the molds 52, 54 are spaced apart an amount equal to the predetermined length of the elongated door 10'. The mold fixture 50 is used to support the new skin 12' while the flanges 46 are being bent downwardly.

Figure 7:
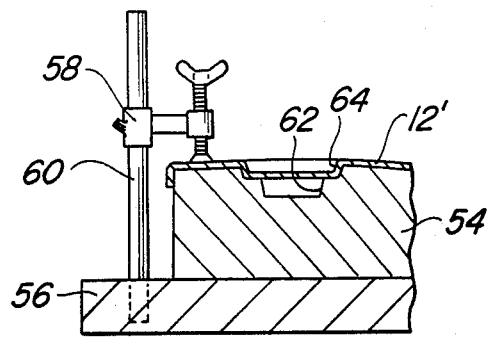
FIG. 7 is an enlarged, cross-sectional view of the mold depression and skin recess corresponding to the door handle.

Referring now to FIGS. 6 and 7, the lower anvil mold 54 contains a depression 62 which is aligned with and corresponds to the rectangular opening 30 in the standard door skin 12. As best shown in FIG. 7, while the skin 12' is clamped to the lower anvil mold 54, a recess 64 is formed in the new skin 12', marking the location where the rectangular opening 30 should be made.

Figure 8:
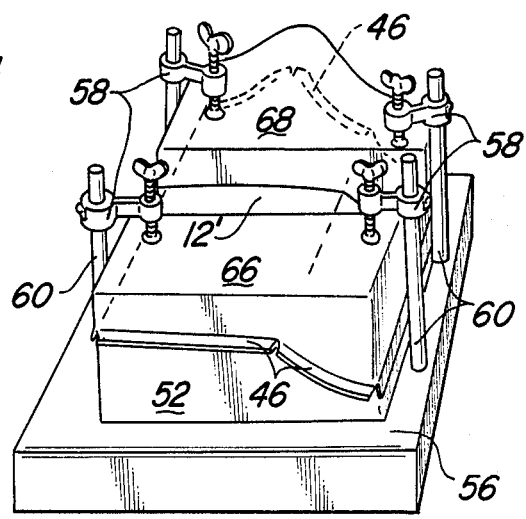
FIG. 8 is a view similar to FIG. 6, but showing the upper molds clamped in position.
Figure 9:
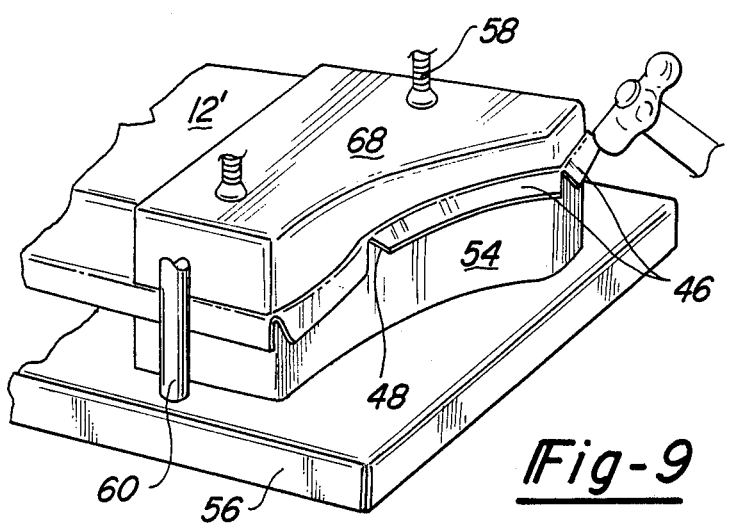
FIG. 9 is an enlarged perspective view showing the flanges being hammered down over the edge of the lower mold.

Referring now to FIGS. 8 and 9, the flanges 46 are bent downwardly over the lower anvil molds 52 and 54 by hammering the flange 46 between intermittent notches 48. To facilitate this process and to prevent buckling of the new skin 12', upper mold sections 66 and 68 are clamped on top of the new skin 12'. The upper mold 66 is contoured and configured to match the skin over the front portion 32 of the door 10, while the upper mold 68 is contoured and configured to match the rear portion 34 of the door 10. The upper molds 66 and 68 are held firmly in place by clamps 58 on pipes 60. The outer edges of the upper molds 66 and 68 are similarly spaced apart a specific distance which corresponds to the length of the elongated door 10'. Alternatively, once the lower anvil mold portions 52 and 54 are in place, the upper molds 66 and 68 can be placed directly over the lower molds 52 and 54, respectively, because they share the same configuration and contour.

Once the upper and lower molds 52, 54, 66 and 68 are firmly clamped in place on the support table 56, the flanges 46 can be bent downwardly over the lower molds 52 and 54. Although a press could be used to stamp the flanges 46, the cost of tooling for a small scale operation would be prohibitive, especially since tooling changes would be required for each model year change. By forming the flanges 46 using the molds and hammering techniques, small scale production is possible without incurring exorbitant expenses for tooling.

The molds 52, 54, 66 and 68 preferably are kirksite molds formed in a conventional fashion. Briefly, an inverse mold is first taken from the door 10 and can be used as the upper molds 66 and 68. Then a positive mold having all the structural features of the door itself is made from the inverse mold. The positive mold becomes the lower anvil molds 52 and 54. By employing relatively inexpensive kirksite molds, the process avoids expensive tooling changes.

Once the flanges 46 are formed in the new skin 12', it is attached to the elongated door substructure 14'. To accomplish this, the flanges 46 are bent around portions of the door substructure 14' and welded thereto in a conventional, well known manner.

From the foregoing detailed description it can be seen that elongated vehicle doors 10' are produced which have an entirely new, preformed outer skin 12'. Thus, welding, grinding and finishing flaws in the outer panel are nonexistent and a smoothly finished door is the end result. By using the process of the present invention, elongated vehicle doors 10' can be produced without incurring expensive tooling costs necessary to prestamp the elongated door skins 12'.

Moreover, doors 10 can be elongated to any desired length by cutting the contoured skin to an appropriate length and adjusting the spacing between the anvil molds 52, 54 to a corresponding length. The spacing between anvil molds 52, 54 is easily adjusted simply by moving the molds on the support table 56 and clamping them in place. Additionally, doors for different brands of limosines may comprise different lengths and any door can be elongated by this method regardless of the manufacturer of the limosine.

The foregoing detailed description of the preferred process has been given for clearness of understanding only and no unnecessary limitations should be understood therefrom. Some modifications will be obvious to those skilled in the art to which the invention pertains, without deviation from the spirit of the invention as defined by the scope of the appended claims.

I claim:

1. A process for elongating vehicle doors having a sheet metal skin attached to a door substructure, said process comprising:
   removing the sheet metal skin from the door substructure;
   severing the door substructure vertically into two portions, each having an outer end;
   inserting extension sections of predetermined length into the door substructure between the severed portions to create an elongated door substructure; and
   applying a new skin to the elongated door substructure.

2. The process as defined in claim 1 wherein inserting the extension sections comprises inserting 4 inch, 6 inch or 8 inch sections.

3. The process as defined in claim 1 wherein inserting the extension sections comprises welding extension sections to the door substructure.

4. The process as defined in claim 1 wherein three extension sections are inserted, said three sections being an inner door panel section, a bracing beam section, and an upper window frame section.

5. The process as defined in claim 1 wherein applying a new skin comprises the additional steps of:
   rollforming a sheet metal blank having two ends to the desired contour;
   shaping the contoured blank into a new skin by cutting the ends of the contoured blank to match the configuration of the elongated door substructure;
   forming flanges on the ends of the new skin; and
   attaching the new skin to the elongated door substructure.

6. The process as defined in claim 5 wherein said shaping includes the use of a template.

7. The process as defined in claim 5 wherein said forming flanges includes intermittently notching the cut ends of the new skin so that flanges can be formed which are configured to wrap around the ends of the elongated door substructure.

8. The process as defined in claim 5 wherein said step of forming flanges comprises:
   placing the new skin on an anvil mold contoured and configured to simulate the outer ends of the elongated door substructure so that flanges of said new skin extend beyond said mold; and
   hammering said flanges downwardly over said anvil mold.

9. The process as defined in claim 8 wherein said mold comprises a kirksite mold.

10. The process as defined in claim 8 wherein said anvil mold comprises two portions, each contoured and configured to simulate one of the ends of the elongated door substructure.

11. The process as defined in claim 10 wherein door skin flanges are formed in new skins of varying lengths by adjusting the spacing between the two anvil mold portions.

12. The process as defined in claim 11 wherein the spacing between said anvil mold portions is adjusted by clamping them to a support table at varying locations.

13. The process as defined in claim 8 and comprising placing an upper mold contoured and configured to simulate the new skin over the new skin prior to the hammering step.

14. The process as defined in claim 13 wherein said upper mold comprises two portions, each contoured and configured to simulate one of the ends of the new skin.

15. The process as defined in claim 13 wherein said upper mold, said new skin and said anvil mold are clamped in a fixed relationship prior to the hammering step.

16. The process as defined in claim 8 and comprising the additional step of forming a recess in the new skin for locating an opening for the door handle.

17. The process as defined in claim 16 wherein said anvil mold comprises a depression into which said recess if formed.

18. The process as defined in claim 8 wherein said anvil mold is made by:
   forming a kirksite negative mold from the door before it is severed;
   forming a kirksite positive mold from the kirksite negative mold;
   severing the positive mold into two portions to form a pair of lower anvil mold portions; and
   severing the negative mold into two portions to form a pair of upper mold portions.

19. The process as defined in claim 5 wherein said attaching comprises wrapping said flanges around said elongated door substructure and spot welding them thereto.

20. A process for elongating vehicle doors having a sheet metal skin attached to a door substructure, said process comprising:
   removing the sheet metal skin from the door substructure;
   severing the door substructure vertically into two portions, each having an outer end;
   welding extension members of predetermined length into the door substructure between the severed portions to create an elongated door substructure;
   rollforming a sheet metal blank having 2 ends to the desired contour;
   shaping the contoured blank into a new skin by cutting the ends of the contoured blank to match the configuration of the elongated door substructure;
   intermittently notching the ends of the new skin;
   placing the new skin on an anvil mold which is contoured and configured to simulate the outer ends of the elongated door substructure so that flanges of said new skin extend beyond said mold;

clamping an upper mold to the new skin so that the flange of new skin extends past the upper mold, said upper mold being contoured and configured to simulate said new skin;

bending said flanges by hammering them downwardly over said anvil mold;

unclamping the flanged new skin from the mold;

attaching the flanged new skin to the elongated door substructure by wrapping said flanges around said substructure and spot welding them thereto.

* * * * *